US010752712B2

(12) United States Patent
Lafaquiere et al.

(10) Patent No.: US 10,752,712 B2
(45) Date of Patent: Aug. 25, 2020

(54) CATALYTIC PREFORM SYSTEM COMPRISING A RARE EARTH METALLOCENE

(71) Applicant: COMPAGNIE GENERALE DES ETABLISSEMENTS MICHELIN, Clermont-Ferrand (FR)

(72) Inventors: Vincent Lafaquiere, Clermont-Ferrand (FR); Julien Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 123 days.

(21) Appl. No.: 15/780,233

(22) PCT Filed: Nov. 30, 2016

(86) PCT No.: PCT/FR2016/053137
§ 371 (c)(1),
(2) Date: May 30, 2018

(87) PCT Pub. No.: WO2017/093654
PCT Pub. Date: Jun. 8, 2017

(65) Prior Publication Data
US 2018/0355083 A1 Dec. 13, 2018

(30) Foreign Application Priority Data

Dec. 3, 2015 (FR) ...................................... 15 61770

(51) Int. Cl.
*C08F 210/02* (2006.01)
*C08F 236/06* (2006.01)
*C08F 4/52* (2006.01)
*C08F 4/64* (2006.01)

(52) U.S. Cl.
CPC ........ *C08F 210/02* (2013.01); *C08F 2420/01* (2013.01); *C08F 2800/10* (2013.01)

(58) Field of Classification Search
CPC .. C08F 4/52; C08F 4/64; C08F 236/06; C08F 210/02
See application file for complete search history.

(56) References Cited

U.S. PATENT DOCUMENTS

| 3,794,604 | A | 2/1974 | Throckmorton et al. |
| 6,569,799 | B1 * | 5/2003 | Barbotin ............... C08F 210/02 |
| | | | 502/152 |
| 8,071,700 | B2 * | 12/2011 | Thuilliez ................. C07F 17/00 |
| | | | 526/164 |
| 8,071,800 | B2 * | 12/2011 | Thuilliez ................. C07F 17/00 |
| | | | 556/7 |
| 2009/0182104 | A1 | 7/2009 | Thuilliez et al. |
| 2010/0022725 | A1 | 1/2010 | Thuilliez et al. |

FOREIGN PATENT DOCUMENTS

| EP | 1092731 A1 | 4/2001 |
| WO | 2007054223 A2 | 5/2007 |
| WO | 2007054224 A2 | 5/2007 |

OTHER PUBLICATIONS

International Search Report (PCT/ISA/210) for PCT/FR2016/053137 dated Jan. 27, 2017.

* cited by examiner

*Primary Examiner* — Rip A Lee
(74) *Attorney, Agent, or Firm* — Dickinson Wright PLLC

(57) ABSTRACT

A catalytic system based at least on a preformation conjugated diene monomer, on an organometallic compound as cocatalyst and on a metallocene of formula $\{P(Cp^1)(Cp^2)Y\}$ is provided. In the formula, Y denotes a group comprising a metal atom which is a rare earth metal, $Cp^1$ and $Cp^2$, which are identical or different, are selected from the group consisting of fluorenyl groups, cyclopentadienyl groups and indenyl groups, the groups being substituted or unsubstituted, and P is a group bridging the two $Cp^1$ and $Cp^2$ groups and comprising a silicon or carbon atom. Such a catalytic system exhibits an improved stability of the catalytic activity over time, in particular on storage.

26 Claims, No Drawings

CATALYTIC PREFORM SYSTEM COMPRISING A RARE EARTH METALLOCENE

This application is a 371 national phase entry of PCT/FR2016/053137 filed on 30 Nov. 2016, which claims benefit of French Patent Application No. 1561770, filed 3 Dec. 2015, the entire contents of which are incorporated herein by reference for all purposes.

BACKGROUND

1. Technical Field

The present invention relates to a preformed catalytic system based on rare earth metal metallocenes, which system can be used in particular in the polymerization of monomers, such as conjugated dienes, ethylene, α-monoolefins and their mixtures. The invention also relates to a process for the preparation of the said catalytic system and to its use in the synthesis of polymers.

2. Related Art

Catalytic systems based on rare earth metal metallocenes are known: they are, for example, described in Patent Applications EP 1 092 731, WO 2004035639 and WO 2007054224 on behalf of the Applicant Companies, to be used in the polymerization of monomers, such as conjugated dienes, ethylene and α-monoolefins. They are the reaction products of a lanthanide metallocene and of a cocatalyst in a hydrocarbon solvent. These catalytic systems, thus formed, have the disadvantage of experiencing a decrease in their catalytic activity on storage. In order to guarantee the specifications of the polymer to be synthesized, it is then necessary, in the polymerization process, to compensate for the fluctuations in the catalytic activity of the catalytic system which result from its storage. This compensation involves the readjustment of the parameters of the polymerization process, such as the respective amounts of the monomers and of the catalytic system. It follows that a phase of adjustment of the parameters of the polymerization process and a phase of stabilization of the polymerization device are required before the device is in a position to produce the polymer to specification. The adjustment and stabilization phases have the effect of reducing the productive output of the production device.

Nevertheless, some of these catalytic systems are of advantage in so far as they make it possible to access ethylene and 1,3-butadiene copolymers of novel microstructure, as a result of the formation of cyclic units in the copolymer chain, which copolymers are of advantage for being used in rubber formulations for the tyre application, as described in Patent Application WO 2014114607 on behalf of the Applicant Companies. It is thus of advantage to find a solution for improving the stability over time of the catalytic activity of these catalytic systems, in particular the stability on storage.

SUMMARY

The Applicant Companies, continuing their efforts, have discovered a catalytic system based on a rare earth metal metallocene exhibiting an improved stability of the catalytic activity on storage, which makes it possible to solve the abovementioned problems encountered. The catalytic system according to the invention has the distinguishing feature of being a catalytic system of "preformed" type.

Thus, a first subject-matter of the invention is a catalytic system based at least:
- on a preformation conjugated diene monomer,
- on a metallocene of formula (I),
- on an organometallic compound as cocatalyst, $$\{P(Cp^1)(Cp^2)Y\} \quad (I)$$

Y denoting a group comprising a metal atom which is a rare earth metal, $Cp^1$ and $Cp^2$, which are identical or different, being selected from the group consisting of fluorenyl groups, cyclopentadienyl groups and indenyl groups, the groups being substituted or unsubstituted, P being a group bridging the two $Cp^1$ and $Cp^2$ groups and comprising a silicon or carbon atom.

The invention also relates to a process for preparing the catalytic system in accordance with the invention.

The invention also relates to a process for the preparation of a polymer which comprises the polymerization of a monomer in the presence of the catalytic system in accordance with the invention.

I. DETAILED DESCRIPTION OF EXAMPLE EMBODIMENTS

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "based on" used to define the constituents of the catalytic system is understood to mean the mixture of these constituents, or the product of the reaction of a portion or of all of these constituents with one another.

In the present patent application, metallocene is understood to mean an organometallic complex, the metal of which, in the case in point the rare-earth metal atom, is bonded to a ligand molecule consisting of two $Cp^1$ and $Cp^2$ groups connected together by a bridge P. These $Cp^1$ and $Cp^2$ groups, which are identical or different, are selected from the group consisting of fluorenyl groups, cyclopentadienyl groups and indenyl groups, it being possible for these groups to be substituted or unsubstituted. It should be remembered that rare earth metals denote the elements scandium, yttrium and the lanthanides, the atomic number of which varies from 57 to 71.

The catalytic system in accordance with embodiments of the invention has the essential characteristic of being a catalytic system preformed from a conjugated diene monomer. The preformation conjugated diene monomer can be a conjugated diene having from 4 to 8 carbon atoms, preferably a 1,3-diene, more preferably 1,3-butadiene.

The preformation conjugated diene monomer is preferably used according to a (preformation conjugated diene monomer/metal of the metallocene) molar ratio ranging from 5 to 1000, preferably from 10 to 500.

The metallocene used as base constituent in the catalytic system in accordance with embodiments of the invention corresponds to the formula (I):

$$\{P(Cp^1)(Cp^2)Y\} \quad (I)$$

in which:
Y denotes a group comprising a metal atom which is a rare earth metal, Cp¹ and Cp², which are identical or different, are selected from the group consisting of fluorenyl groups, cyclopentadienyl groups and indenyl groups, the groups being substituted or unsubstituted, P is a group bridging the two Cp¹ and Cp² groups and comprising a silicon or carbon atom.

In the formula (I), the rare earth metal atom is connected to a ligand molecule consisting of the two Cp¹ and Cp² groups connected together by the bridge P.

Mention may be made, as substituted cyclopentadienyl, fluorenyl and indenyl groups, of those substituted by alkyl radicals having from 1 to 6 carbon atoms or by aryl radicals having from 6 to 12 carbon atoms or else by trialkylsilyl radicals, such as SiMe₃ radicals. The choice of the radicals is also guided by the accessibility to the corresponding molecules, which are the substituted cyclopentadienes, fluorenes and indenes, because the latter are commercially available or can be easily synthesized.

Mention may in particular be made, as substituted fluorenyl groups, of 2,7-di(tert-butyl)fluorenyl and 3,6-di(tert-butyl)fluorenyl. Positions 2, 3, 6 and 7 respectively denote the positions of the carbon atoms of the rings, as is represented in the diagram below, position 9 corresponding to the carbon atom to which the bridge P is attached.

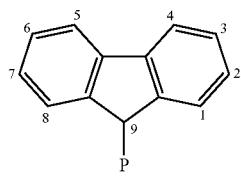

Mention may in particular be made, as substituted cyclopentadienyl groups, of those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

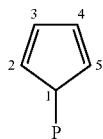

Mention may in particular be made, as substituted indenyl groups, of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

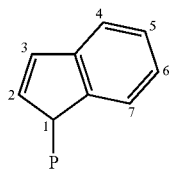

According to a preferred embodiment of the invention, Cp¹ and Cp² are identical and are selected from the group consisting of substituted fluorenyl groups and the unsubstituted fluorenyl group of formula $C_{13}H_8$.

The catalytic system according to this preferred embodiment has the distinguishing feature of resulting in copolymers of butadiene and ethylene which comprise, in addition to the ethylene monomer units and butadiene units, cyclic 1,2-cyclohexane units of following formula:

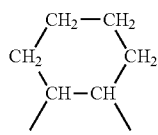

Advantageously, Cp¹ and Cp² are identical and each represent an unsubstituted fluorenyl group of formula $C_{13}H_8$, represented by the symbol Flu.

According to a preferred embodiment of the invention, the symbol Y represents the group Met-G, with Met denoting a metal atom which is a rare earth metal and with G denoting a group comprising the borohydride BH₄ unit or denoting a halogen atom X selected from the group consisting of chlorine, fluorine, bromine and iodine. Advantageously, G denotes chlorine or the group of formula (II):

$$(BH_4)_{(1+y)}\text{-}L_y\text{-}N_x \quad (II)$$

in which:
L represents an alkali metal selected from the group consisting of lithium, sodium and potassium,
N represents a molecule of an ether,
x, which is or is not an integer, is equal to or greater than 0,
y, which is an integer, is equal to or greater than 0.

Any ether which has the ability to complex the alkali metal, in particular diethyl ether and tetrahydrofuran, is suitable as ether.

According to any one of the embodiments of the invention, the metal of the metallocene of use for the requirement of invention, in the case in point the rare earth metal, is preferably a lanthanide, the atomic number of which ranges from 57 to 71, more preferably neodymium, Nd.

The bridge P connecting the Cp¹ and Cp² groups preferably corresponds to the formula ZR¹R², in which Z represents a silicon or carbon atom and R¹ and R², which are identical or different, each represent an alkyl group comprising from 1 to 20 carbon atoms, preferably a methyl. In the formula ZR¹R², Z advantageously denotes a silicon atom, Si.

According to a particularly preferred embodiment, the metallocene is the (dimethylsilyl)bisfluorenylneodymium borohydride of formula (III):

$$[Me_2Si(Flu)_2Nd(\mu\text{-}BH_4)_2Li(THF)] \quad (III)$$

in which Flu represents the $C_{13}H_8$ group.

Another base constituent of the catalytic system in accordance with embodiments of the invention is the cocatalyst capable of activating the metallocene with regard to the polymerization, in particular in the polymerization initiation reaction. The cocatalyst is, in a well-known way, an organometallic compound. The organometallic compounds capable of activating the metallocene, such as organomagnesium, organoaluminium and organolithium compounds, may be suitable.

The cocatalyst is preferably an organomagnesium compound, that is to say a compound with exhibits at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound exhibits two C—Mg bonds, in the case in point C—Mg—C; the organomagnesium halide exhibits one C—Mg bond. More preferably, the cocatalyst is a diorganomagnesium compound.

According to a particularly preferred embodiment of the invention, the cocatalyst is an organometallic compound comprising an alkyl group bonded to the metal atom. Alkylmagnesium compounds, very particularly dialkylmagnesium compounds, or alkylmagnesium halides, such as, for example, butyloctylmagnesium and butylmagnesium chloride, are particularly suitable as cocatalyst, also known as alkylating agent. The cocatalyst is advantageously butyloctylmagnesium.

The cocatalyst is used according to a (cocatalyst/metal of the metallocene) molar ratio preferably ranging from 0.5 to 20, more preferably from 1 to 10.

According to any one of the embodiments of the invention, the catalytic system preferably comprises a hydrocarbon solvent. The catalytic system can be provided in the form of a solution when it is in the presence of a hydrocarbon solvent. The hydrocarbon solvent can be aliphatic, such as methylcyclohexane, or aromatic, such as toluene. The hydrocarbon solvent is preferably aliphatic, more preferably methylcyclohexane. Generally, the catalytic system is stored in the form of a solution in the hydrocarbon solvent before being used in polymerization. It is then possible to speak of catalytic solution which comprises the catalytic system and the hydrocarbon solvent.

When the catalytic system is in solution, its concentration is defined by the content of metallocene metal in the solution. The concentration of metallocene metal has a value preferably ranging from 0.0001 to 0.05 mol/l, more preferably from 0.001 to 0.03 mol/l.

Another subject-matter of the invention is the preparation of the catalytic system described above.

The process for the preparation of the catalytic system in accordance with embodiments of the invention comprises the following stages a) and b):
a) reacting, in a hydrocarbon solvent, the cocatalyst and the metallocene,
b) reacting the preformation conjugated diene monomer with the reaction product from stage a).

The metallocene used for the preparation of the catalytic system can be in the form of a crystalline or non-crystalline powder, or else in the form of single crystals. The metallocene can be provided in a monomer or dimer form, these forms depending on the method of preparation of the metallocene, as for example is described in Application WO 2007054224 A2. The metallocene can be prepared conventionally by a process analogous to that described in the documents EP 1 092 731, WO 2007054223 and WO 2007054224, in particular by reaction, under inert and anhydrous conditions, of the salt of an alkali metal of the ligand with a rare earth metal salt, such as a rare earth metal halide or borohydride, in a suitable solvent, such as an ether, for example diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in the solid form.

Stage a) correspond to the stage of activation, also commonly known as alkylation, of the metallocene by the cocatalyst; stage b) corresponds to the stage of preformation of the catalytic system.

The hydrocarbon solvent used in the synthesis of the catalytic system is generally of the same chemical nature as the solvent of the catalytic solution defined above, that is to say an aliphatic hydrocarbon solvent, such as methylcyclohexane, or an aromatic hydrocarbon solvent, such as toluene. Typically, the hydrocarbon solvent in which the catalytic system is in solution originates from the preparation of the catalytic system.

In stage a), the cocatalyst is generally added to the hydrocarbon solvent, followed by the metallocene. Stage a) generally takes place at a temperature ranging from 20° C. to 80° C. The reaction time of stage a) is preferably between 5 and 60 minutes and more preferably varies from 10 to 20 minutes.

Stage b) is generally carried out at a temperature ranging from 40° C. to 100° C., preferably from 60° C. to 90° C. The reaction time of stage b) typically varies from 1 hour to 24 hours, preferably from 5 h to 12 h. In stage b), the preformation conjugated diene monomer is added to the reaction product from stage a).

Stage b) can be followed by a degassing stage c) in order to remove the preformation conjugated diene monomer which has not reacted during stage b).

Like any synthesis carried out in the presence of an organometallic compound, the synthesis takes place under anhydrous conditions under an inert atmosphere, both for stage a) and for stage b) and, if appropriate, stage c). Typically, the reactions are carried out starting from anhydrous solvents and monomers under anhydrous nitrogen or argon. Stages a), b) and c) are generally carried out with stirring.

Before being used, for example, in polymerization, the catalytic system thus obtained in solution can be stored under an inert atmosphere, for example under nitrogen or argon, in particular at a temperature ranging from −20° C. to ambient temperature (23° C.).

Another subject-matter of the invention is a process for the preparation of a polymer which comprises the polymerization of a monomer M in the presence of the catalytic system in accordance with embodiments of the invention. The monomer M is to be distinguished from the preformation monomer used in the preparation of the catalytic system in stage b): the monomer M may or may not be of the same chemical nature as the monomer used in stage b). The monomer M is preferably selected from the group of the monomers consisting of conjugated dienes, ethylene, α-monoolefins and their mixtures. More preferably, the monomer M is a 1,3-diene preferably having from 4 to 8 carbon atoms, in particular 1,3-butadiene or isoprene, or else a mixture of 1,3-butadiene and ethylene.

According to the microstructure and the length of the polymer chains prepared by the process in accordance with embodiments of the invention, the polymer can be an elastomer.

The polymerization is preferably carried out in solution, continuously or batchwise. The polymerization solvent can be an aromatic or aliphatic hydrocarbon solvent. Mention may be made, as example of polymerization solvent, of toluene and methylcyclohexane. The monomer charge can be introduced into the reactor containing the polymerization solvent and the catalytic system or, conversely, the catalytic system can be introduced into the reactor containing the polymerization solvent and the monomer charge. The polymerization is typically carried out under anhydrous conditions and in the absence of oxygen, in the optional presence of an inert gas. The polymerization temperature generally varies within a range extending from 40° C. to 120° C., preferably from 60° C. to 90° C.

The polymerization can be halted by cooling the polymerization medium. The polymer can be recovered according to conventional techniques known to a person skilled in the art, such as, for example, by precipitation, by evaporation of the solvent under reduced pressure or by steam stripping.

The abovementioned characteristics of embodiments of the present invention, and also others, will be better understood on reading the following description of several exemplary embodiments of the invention, given by way of illustration and without limitation.

II. EXEMPLARY EMBODIMENTS

II.1-Preparation of Catalytic Systems in Accordance with the Invention: Examples 1 to 6

The catalytic systems C1-C6 in accordance with embodiments of the invention are prepared according to the following procedure.

The cocatalyst butyloctylmagnesium (BOMAG) and then the metallocene [Me$_2$Si(Flu)$_2$Nd($\mu$-BH$_4$)$_2$Li(THF)] are added, in the contents shown in Table I, to a reactor containing the hydrocarbon solvent methylcyclohexane (MCH) or toluene (Tol). The activation time is 10 minutes and the reaction temperature is 20° C. (stage a)). Subsequently, the preformation conjugated diene monomer, 1,3-butadiene, is introduced into the reactor in the proportions shown in Table I. The preformation reaction takes place at a temperature shown in Table I, for a period of time also shown in Table I. On conclusion of stage b), the reactor is degassed and flushed with nitrogen in order to remove the unconverted 1,3-butadiene. The metallocene can be prepared according to the procedure described in Patent Application WO 2007054224.

II.2-Preparation of Catalytic Systems not in Accordance with the Invention: Examples 7, 8 and 9

The catalytic system C7 not in accordance with the invention is prepared according to the process disclosed in Patent Application WO 2007054224 and described below:

The cocatalyst, the butyloctylmagnesium (BOMAG) and then the metallocene [Me$_2$Si(Flu)$_2$Nd($\mu$-BH$_4$)$_2$Li(THF)] are added, in the contents shown in Table II, to a reactor containing toluene (Tol). The activation time is 10 minutes and the reaction temperature is 20° C. Its preparation conditions appear in Table II.

The catalytic system C8 not in accordance with the invention is prepared in a similar way to the catalytic system C7 except for the solvent, which is methylcyclohexane.

The catalytic system C9 not in accordance with the invention is prepared according to the following procedure:

The cocatalyst, the butyloctylmagnesium (BOMAG) and then the metallocene [Me$_2$Si(Flu)$_2$Nd($\mu$-BH$_4$)$_2$Li(THF)] are added, in the contents shown in Table II, to a reactor containing the hydrocarbon solvent methylcyclohexane (MCH). The activation time is 1 h and the reaction temperature is 60° C.

The catalytic systems C7, C8 and C9 are not in accordance with the invention due to the absence of the preformation stage (stage b)). These are catalytic systems known from the state of the art, in particular from Patent Application WO 2007054224.

II.3-Conditions for Storage of the Catalytic Systems

Unless otherwise indicated, the catalytic systems C1 to C6 in accordance with embodiments of the invention are stored immediately after their preparation in bottles which are hermetically closed under a nitrogen atmosphere at −20° C.

For the study of the stability of the catalytic activity on storage of a catalytic system in accordance with embodiments of the invention, bottles which are hermetically closed under nitrogen containing the catalytic system C1 are also stored at 4° C. or 23° C.

The catalytic systems C7 and C8 not in accordance with the invention are not stored and are used at once in the polymer synthesis in order to determine their catalytic activities.

The catalytic system C9 not in accordance with the invention, if it is not used at once in the polymer synthesis, is stored immediately after its preparation in bottles which are hermetically closed under a nitrogen atmosphere at 23° C.

II.4-Stability of the Catalytic Activities of the Catalytic Systems: Examples 10 to 14

The catalytic systems C1 and C9 are used in polymerization without having been stored after their synthesis or after having been stored at ambient temperature (23° C.) or 4° C. for variable periods of time. The catalytic activities of the catalytic systems C1 and C9 are determined, according to whether or not they have been stored, under the polymerization conditions described below.

The polymerization is carried out at 80° C. and an initial pressure of 4 bar in a 500-ml glass reactor containing 300 ml of polymerization solvent, methylcyclohexane, the catalytic system and the monomers, the monomers 1,3-butadiene and ethylene being introduced in the form of a gas mixture containing 20 mol % of 1,3-butadiene. The polymerization reaction is halted by cooling and degassing the reactor. The copolymer is recovered by precipitation from methanol and then dried. The weight weighed makes it possible to determine the mean catalytic activity of the catalytic system, expressed in kilograms of copolymer synthesized per mole of neodymium metal and per hour (kg/mol·h).

The results for catalytic activity according to the storage time and the storage temperature of the catalytic system in solution appear in Table III.

It is observed that the catalytic activity of the catalytic system C1 is the same before or after storage. Even storage of the catalytic system C1 at 23° C. for more than 45 days or at 4° C. for more than 3 months has no effect in decreasing its catalytic activity.

On the other hand, it is observed that the catalytic system C9 not in accordance with the invention does not exhibit a catalytic activity which is as stable on storage at 23° C. as C1. This is because the catalytic system C9 exhibits a decline in catalytic activity of more than 20% after only 10 days of storage at 23° C.

The maintenance of the catalytic activity over a long period makes it possible to use one and the same manufacturing batch of a catalytic system in accordance with embodiments of the invention over this same period without having to carry out, during this period, phases of readjustment of the parameters of the polymerization process and of rendering the polymerization device stable again, while guaranteeing the specifications of the polymer to be synthesized.

II.5-Comparison of the Catalytic Activities of the Catalytic Systems in Accordance with the Invention with Those of the Catalytic Systems of the State of the Art: Examples 10, 13 and P1 to P7

The catalytic systems C1 to C6 in accordance with embodiments of the invention and the catalytic systems C7 to C9 not in accordance with the invention are each used in the polymerization of a mixture of ethylene and 1,3-butadiene according to the procedure described below.

The polymerization is carried out at 80° C. and an initial pressure of 4 bar in a 500-ml glass reactor containing 300 ml of polymerization solvent, methylcyclohexane (Example 10, Example 13, Examples P1 to P5 and P7) or toluene (Example P6), the catalytic system and the monomers, the monomers 1,3-butadiene and ethylene being introduced in the form of a gas mixture containing 20 mol % of 1,3-butadiene. The polymerization reaction is halted by cooling and degassing the reactor. The copolymer is recovered by precipitation from methanol and then dried. The weight weighed makes it possible to determine the mean catalytic activity of the catalytic system, expressed in kilograms of copolymer synthesized per mole of neodymium metal and per hour (kg/mol·h).

The mean catalytic activities calculated for each of the catalytic systems appear in Tables III and IV. Examples 10 and P1 to P5 are in accordance with embodiments of the invention as they employ a catalytic system in accordance with embodiments of the invention (C1 to C6); Examples 13, P6 and P7 are not in accordance with the invention as they employ a catalytic system of the state of the art (C7, C8 and C9).

It is noted that, for a given polymerization hydrocarbon solvent, methylcyclohexane, the catalytic activities of the catalytic systems C1 to C6 are at least equal to, indeed even greater than, that of the catalytic system of the state of the art (C8 or C9). This is because the catalytic activities of the catalytic systems in accordance with embodiments of the invention, determined in Examples P1 to P5, are from 1.13 to 1.26 times greater than that of C8, determined in Example P7.

Furthermore, the activities of the catalytic systems C1 to C6, used for a polymerization in methylcyclohexane, are comparable to, indeed even greater than, that of the catalytic system of the state of the art C7 for a polymerization in toluene, determined in Example P6.

The preformation of the catalytic system in accordance with embodiments of the invention also makes it possible to improve the productive output of the catalytic systems for the copolymerization of olefin and conjugated diene in an aliphatic hydrocarbon solvent and to obtain productive outputs in aliphatic hydrocarbon solvent which are similar to, indeed even greater than, those obtained in aromatic hydrocarbon solvent with the catalytic systems of the state of the art.

Finally, the catalytic systems in accordance with embodiments of the invention can be synthesized both in aromatic solvent (toluene, Examples 2 and 3) and in aliphatic solvent, without their catalytic activities being affected. This is because the catalytic activities of C2 and C3 (Examples P1 and P2) are comparable to those of C1 and C4 to C6 synthesized in an aliphatic hydrocarbon solvent, methylcyclohexane (Examples 10 and P3 to P5).

TABLE I

| Example | Metallocene (mol/l) | Cocatalyst (mol/l) | Hydrocarbon solvent | Preformation time (h) | Preformation temperature (° C.) | Monomer/ metal Nd molar ratio | Catalytic system |
|---|---|---|---|---|---|---|---|
| 1 | 0.008 | 0.018 | MCH | 1 | 50 | 90 | C1 |
| 2 | 0.02 | 0.04 | Tol | 1 | 50 | 30 | C2 |
| 3 | 0.01 | 0.02 | Tol | 1 | 50 | 30 | C3 |
| 4 | 0.008 | 0.018 | MCH | 5 | 50 | 90 | C4 |
| 5 | 0.0048 | 0.01056 | MCH | 24 | 60 | 90 | C5 |
| 6 | 0.001 | 0.0022 | MCH | 5 | 60 | 90 | C6 |

TABLE II

| Example | Metallocene (mol/l) | Cocatalyst (mol/l) | Hydrocarbon solvent | Activation time (min) | Activation temperature (° C.) | Catalytic system |
|---|---|---|---|---|---|---|
| 7 | 0.0001 | 0.0008 | Tol | 10 | 20 | C7 |
| 8 | 0.0001 | 0.0008 | MCH | 10 | 20 | C8 |
| 9 | 0.01 | 0.02 | MCH | 60 | 60 | C9 |

TABLE III

| Example | Catalytic system | Storage time (days) | Storage temperature | Polymerization solvent | Activity kg/mol · h |
|---|---|---|---|---|---|
| 10 | C1 | 0 | — | MCH | 146 |
| 11 | C1 | 45 | 23° C. | MCH | 155 |
| 12 | C1 | 106 | 4° C. | MCH | 153 |
| 13 | C9 | 0 | — | MCH | 141 |
| 14 | C9 | 10 | 23° C. | MCH | 109 |

TABLE IV

| Example | Catalytic system | Polymerization solvent | Activity kg/mol · h |
|---|---|---|---|
| P1 | C2 | MCH | 153 |
| P2 | C3 | MCH | 158 |
| P3 | C4 | MCH | 163 |
| P4 | C5 | MCH | 166 |
| P5 | C6 | MCH | 171 |
| P6 | C7 | Tol | 159 |
| P7 | C8 | MCH | 135 |

The invention claimed is:

1. A catalytic system based at least on:
a preformation conjugated diene monomer,
a metallocene of formula (I),
an organometallic compound as cocatalyst, $$\{P(Cp^1)(Cp^2)Y\} \quad (I),$$

Y denoting a group comprising a metal atom which is a rare earth metal,
$Cp^1$ and $Cp^2$, which are identical or different, being selected from the group consisting of fluorenyl groups, cyclopentadienyl groups and indenyl groups, the groups being substituted or unsubstituted,
P being a group bridging the two $Cp^1$ and $Cp^2$ groups and comprising a silicon or carbon atom, and
in which a molar ratio of the preformation conjugated diene monomer to the rare earth metal of the metallocene has a value ranging from 5 to 1000.

2. A catalytic system according to claim 1, in which the cocatalyst is an organomagnesium compound.

3. A catalytic system according to claim 1, in which the cocatalyst is an organometallic compound comprising an alkyl group bonded to a metal atom.

4. A catalytic system according to claim 1, in which the cocatalyst is a dialkylmagnesium compound or an alkylmagnesium halide.

5. A catalytic system according to claim 1, in which $Cp^1$ and $Cp^2$ are identical and are selected from the group consisting of substituted fluorenyl groups and an unsubstituted fluorenyl group of formula $C_{13}H_8$.

6. A catalytic system according to claim 1, in which $Cp^1$ and $Cp^2$ each represent an unsubstituted fluorenyl group of formula $C_{13}H_8$.

7. A catalytic system according to claim 1, in which the symbol Y represents the group Met-G, with Met denoting a metal atom which is a rare earth metal and G denoting a group comprising the borohydride $BH_4$ unit or denoting a halogen atom X selected from the group consisting of chlorine, fluorine, bromine and iodine.

8. A catalytic system according to claim 7, in which G denotes chlorine or a group of formula (II):

$$(BH_4)_{(1+y)}\text{-}L_y\text{-}N_x \quad (II)$$

in which:
L represents an alkali metal selected from the group consisting of lithium, sodium and potassium,
N represents a molecule of an ether,
x, which is or is not an integer, is equal to or greater than 0,
y, which is an integer, is equal to or greater than 0.

9. A catalytic system according to claim 1, in which the rare earth metal is a lanthanide, the atomic number of which varies from 57 to 71.

10. A catalytic system according to claim 1, in which the rare earth metal is neodymium (Nd).

11. A catalytic system according to claim 1, in which P corresponds to the formula $ZR^1R^2$, Z representing a silicon or carbon atom and $R^1$ and $R^2$, which are identical or different, each representing an alkyl group comprising from 1 to 20 carbon atoms.

12. A catalytic system according to claim 11, in which Z is Si.

13. A catalytic system according to claim 1, in which the metallocene is of formula (III):

$$[Me_2Si(Flu)_2Nd(\mu\text{-}BH_4)_2Li(THF)] \quad (III)$$

Flu representing the $C_{13}H_8$ group.

14. A catalytic system according to claim 1, in which the preformation conjugated diene monomer is a 1,3-diene.

15. A catalytic system according to claim 14, in which the preformation conjugated diene monomer is 1,3-butadiene.

16. A catalytic system according to claim 1, in which a molar ratio of cocatalyst to the rare earth metal of the metallocene has a value ranging from 0.5 to 20.

17. A catalytic system according to claim 1, which catalytic system comprises a hydrocarbon solvent.

18. A catalytic system according to claim 17, in which the hydrocarbon solvent is aromatic or aliphatic.

19. A catalytic system according to claim 17, in which a molar concentration of rare earth metal of the metallocene in the catalytic system has a value ranging from 0.0001 to 0.05 mol/l.

20. A process for the preparation of a catalytic system defined in claim 1, which comprises the following stages a) and b):
a) reacting, in a hydrocarbon solvent, the cocatalyst and the metallocene,
b) reacting the preformation conjugated diene monomer with the reaction product from stage a).

21. A process according to claim 20, in which stage a) takes place at a temperature ranging from 20° C. to 80° C. and stage b) is carried out at a temperature ranging from 40° C. to 100° C.

22. A process for the preparation of a polymer which comprises the polymerization of a monomer M in the presence of a catalytic system defined in claim 1.

23. A process according to claim 22, in which the monomer M is selected from the group consisting of conjugated dienes, ethylene, α-monoolefins and their mixtures.

24. A process according to claim 22, in which the monomer M is a 1,3-diene.

25. A process according to claim 22, in which the monomer M is 1,3-butadiene or a mixture of 1,3-butadiene and ethylene.

26. A process according to claim 22, in which the polymer is an elastomer.

* * * * *